(12) United States Patent
Harrison et al.

(10) Patent No.: US 6,466,278 B1
(45) Date of Patent: Oct. 15, 2002

(54) APPLIANCES

(75) Inventors: Robert G. Harrison; Daniel W. Knodle, both of Seattle, WA (US); Gary M. Bang, Chandler, AZ (US)

(73) Assignee: Icebox, LLC, Lake Forest, IL (US)

( * ) Notice: Subject to any disclaimer, the term of this patent is extended or adjusted under 35 U.S.C. 154(b) by 0 days.

(21) Appl. No.: 09/516,427

(22) Filed: Mar. 1, 2000

Related U.S. Application Data

(60) Provisional application No. 60/174,964, filed on Jan. 6, 2000.

(51) Int. Cl.$^7$ .............................. H04N 5/64; A47F 5/08
(52) U.S. Cl. ..................... 348/836; 312/245; 248/917
(58) Field of Search ..................... 312/7.2, 242, 245; 348/836, 837, 838; 248/917, 918, 919, 920, 921, 922

(56) References Cited

U.S. PATENT DOCUMENTS

| | | | |
|---|---|---|---|
| 3,574,340 A | | 4/1971 | Busche |
| 4,313,043 A | * | 1/1982 | White et al. ............. 312/245 X |
| 4,438,458 A | * | 3/1984 | Munscher ............... 348/838 X |
| 4,579,473 A | | 4/1986 | Brugger |
| 4,580,853 A | * | 4/1986 | Hitzeroth et al. ............ 312/245 |
| 4,831,449 A | * | 5/1989 | Kimura .................. 348/836 X |
| 5,127,721 A | * | 7/1992 | Inden ...................... 312/242 X |
| 5,158,344 A | | 10/1992 | Thurston ..................... 312/7.2 |
| 5,173,781 A | | 12/1992 | Masreliez |
| 5,179,447 A | * | 1/1993 | Lain ............................ 348/837 |
| 5,577,819 A | * | 11/1996 | Olsen ..................... 312/245 X |
| 5,724,102 A | | 3/1998 | Harrison et al. ............. 348/552 |
| 5,751,369 A | | 5/1998 | Harrison et al. ............. 348/552 |
| 5,946,055 A | * | 8/1999 | Rosen ......................... 348/837 |
| 6,186,459 B1 | * | 2/2001 | Ma ........................ 248/919 X |
| 6,215,420 B1 | | 4/2001 | Harrison et al. |

FOREIGN PATENT DOCUMENTS

| | | | | |
|---|---|---|---|---|
| EP | 58242 | * | 8/1982 | .................. 312/7.2 |
| JP | 40-4185547 | * | 7/1992 | .................. 348/837 |
| JP | 40-5050883 | * | 3/1993 | .................. 348/837 |

* cited by examiner

Primary Examiner—James O. Hansen
(74) Attorney, Agent, or Firm—Sonnenschein Nath & Rosenthal

(57) ABSTRACT

Appliances designed to be mounted on the bottom of a structure such as an overhead cabinet system. The appliance has an integrated unit (or module) which includes a television tuner and, optionally, a player for an optically readable disk. The appliance also has a display unit of the flat screen type. The display unit is attached to the appliance module by a universal pivot mechanism which allows the unit to be: (a) rotated and tilted to face a viewer, and (b) folded up against the appliance module and out of the way when the display unit is not in use.

18 Claims, 18 Drawing Sheets

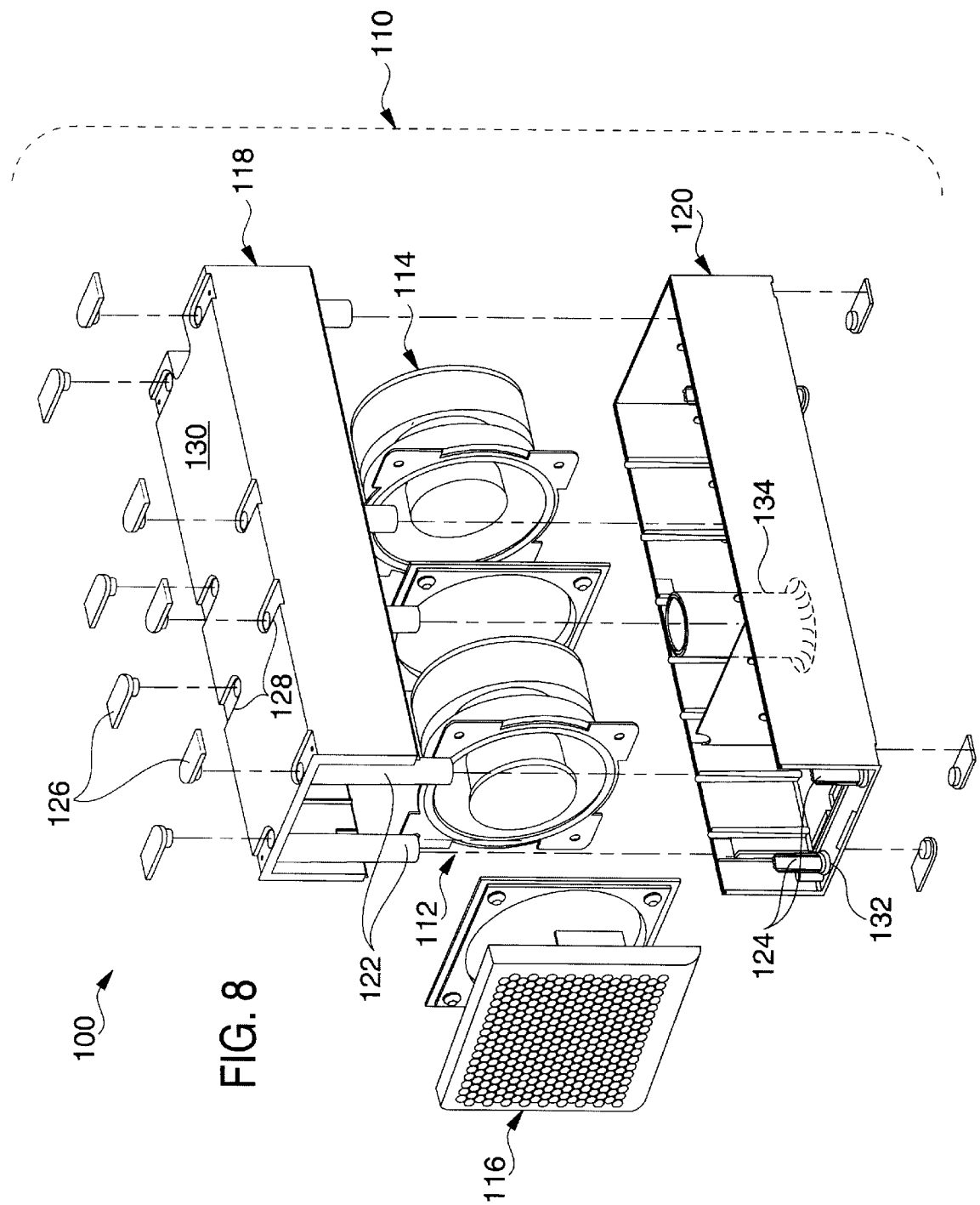

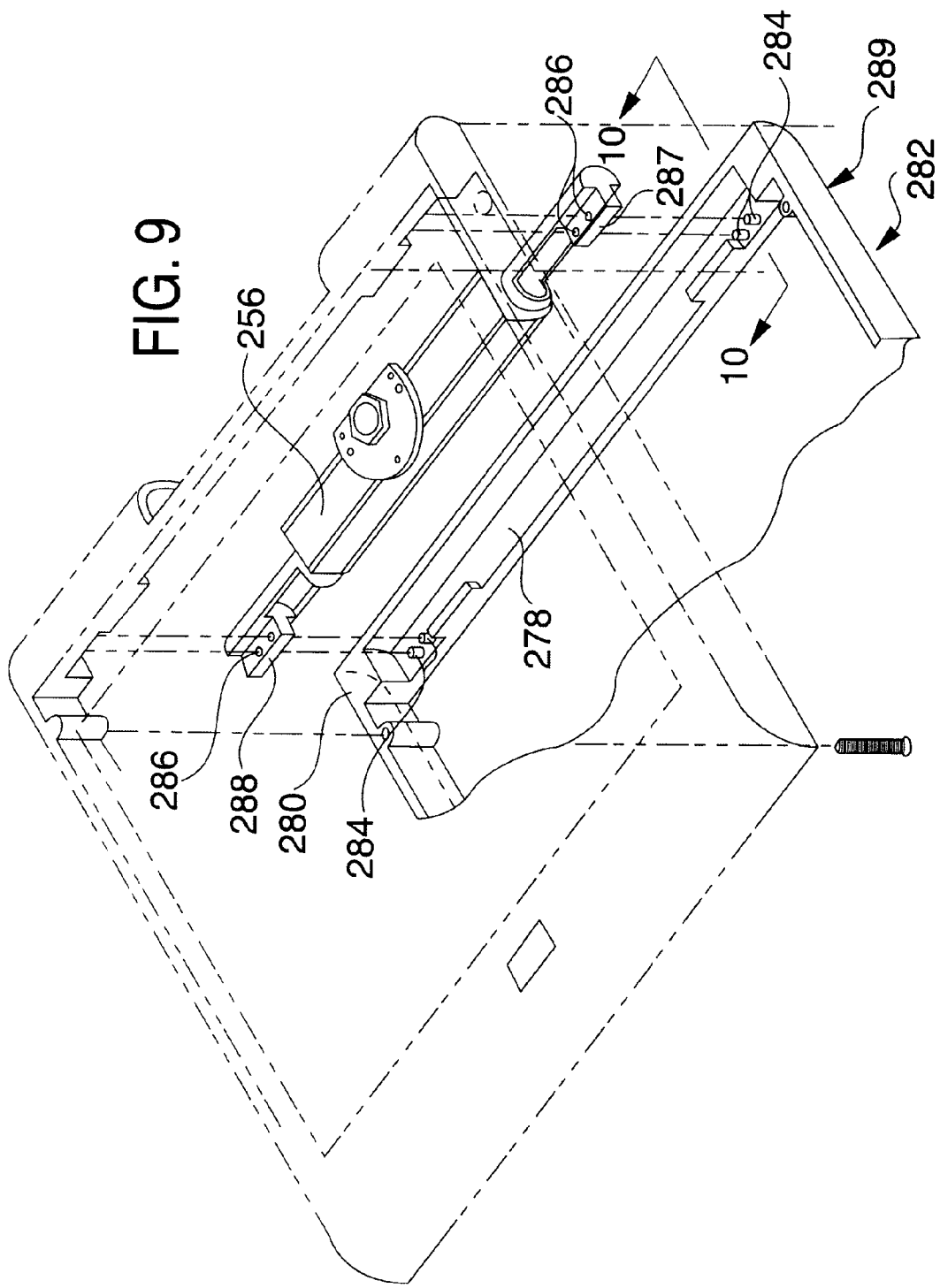

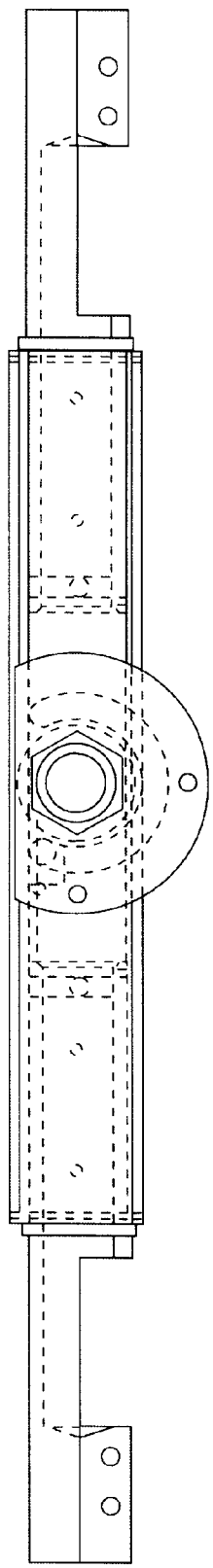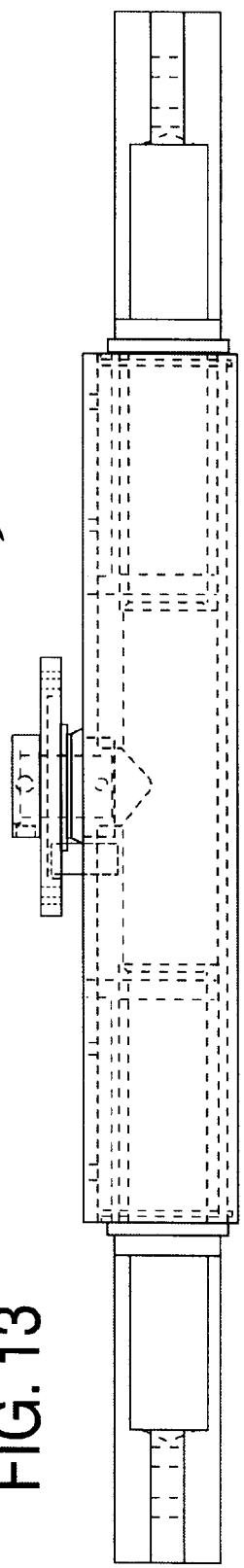
FIG. 12
FIG. 13

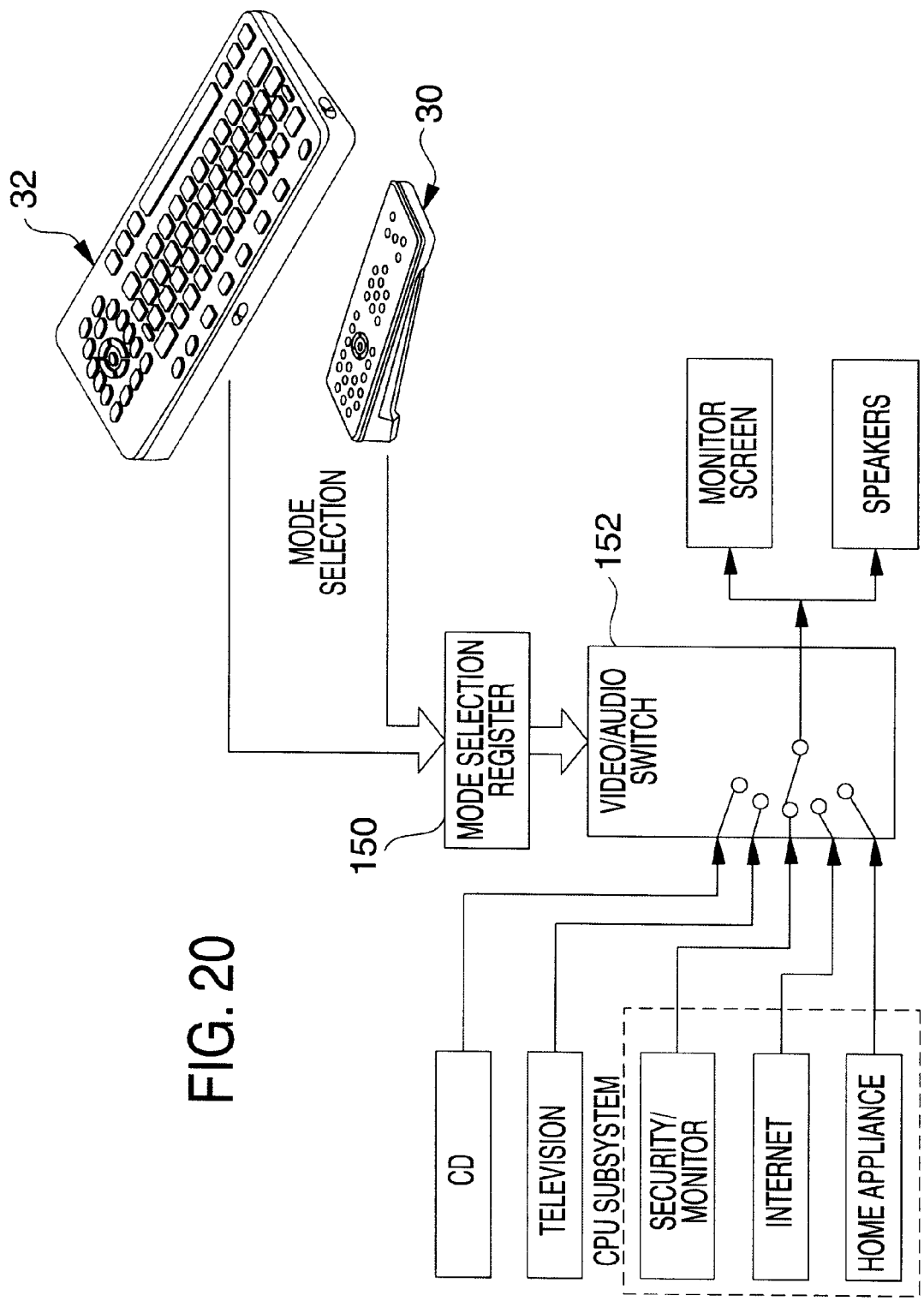

APPLIANCES

CROSS-REFERENCE TO RELATED APPLICATIONS

This application is related to and claims the benefit of the filing date of U.S. Provisional Application No. 60/174,964 filed Jan. 6, 2000.

TECHNICAL FIELD OF THE INVENTION

The present invention relates to appliances which can be operated in a selected one of multiple modes and, more particularly, to appliances of that type designed to be located under overhead counters, shelves, and the like.

BACKGROUND OF THE INVENTION

Disclosed in U.S. Pat. No. 5,751,369 and in copending U.S. patent applications Ser. Nos. 09/046,947; 08/985,815 now abandoned; Ser. Nos. 09/116,785; 09/116,825; and are certain new and novel appliances with multiple modes of operation or capabilities. Modes of operation and the capabilities they may possess include, but are not limited to, the following:

TV—used to watch television;
CD—used to play a conventional audio or video disk or a laser-readable disk from which the user can retrieve information on a particular task or subject;
APPLIANCE—one or more major appliances are supervised with problems, needs for periodic maintenance, and similar information on the status of the monitored appliance(s) being made available on screen at the supervising module and/or at a repair or service facility or other remote location;
SECURITY—allows a user to view and converse with a person at an entry way and to unlock a door at the entry way, all from a remote location. The multi-modal appliance can also be used in this mode to monitor an area removed from the appliance—for example, a baby's bedroom;
INTERNET—allows a user to log onto and browse the Internet and to send e-mail messages.

The previously disclosed appliances of the character just described include a module (or integrated unit) which includes a TV monitor and a player for an optically readable disk. Visual images are presented in the previously disclosed units on the screen of a cathode ray tube (CRT) designed to rest on a table, countertop, workbench, or other support with a flat, horizontal surface on which the module can be placed. This takes up counter space that is limited and could best be put to other uses.

SUMMARY OF THE INVENTION

Disclosed herein are certain new and novel appliances of the character described above which are designed to be mounted to the under (or bottom) side of an overhead cupboard, shelf, or other structure. This frees up the work space occupied by the integrated unit of the previously disclosed units, making that space available for other uses.

Structurally, the novel mode appliances described herein differ from those previously disclosed in that images are generated on a flat screen monitor instead of a CRT screen. A novel coupling mechanism allows the screen to be: (1) folded up and against the casing of the unit when not in use, and (2) folded down and rotated into a position facing the appliance user when the appliance is in use. This ability to rotate (and tilt) the flat screen is important. Flat screens must be viewed head on to produce a satisfactory image, and the novel coupling of the present invention allows this to be done. Also, by first rotating and then folding up the display unit in which the screen is incorporated, the screen is protected from blows which might damage it by the housing of the display unit.

A clutch is included in the pivot mechanism. The clutch insures that the screen display unit will remain in the orientation to which it is adjusted by the appliance user or other person.

The display screen unit is mounted and contoured such that, when the screen unit is stowed against the module with the screen facing the module, the exposed edge contour of the screen unit matches the lower edge contour of the appliance module cabinet. This gives the appliance a neat, finished appearance which is important from the viewpoint of aesthetics.

Appliances of concern herein are designed to be operated by a remote control or keyboard, preferably one capable of transmitting signals in the infrared portion of the electromagnetic spectrum. A novel array of infrared radiation receivers—one on the display unit and others on the front and bottom of the appliance's main module are employed; thus insuring that transmitted signals are received irrespective of the orientation of the display unit and the location of the person using the input device.

It is preferred, though not essential, that the appliance disclosed herein have speakers assembled to the casing of the appliance's integrated unit. This contributes to compactness and eliminates the problems which external speaker wires might pose. A novel combination of speaker and cabinet construction and location of the speakers relative to the cabinet optimizes the quality of the sound generated by the speakers.

The advantages, features, and objects of the present invention will be apparent to the reader from the foregoing, the appendant claims, and the ensuing detailed description and discussion of the application as it proceeds in conjunction with the accompanying drawings.

BRIEF DESCRIPTION OF THE DRAWINGS

FIG. 3A shows a detail of FIG. 3 to an enlarged scale;

FIG. 8 is an exploded view of the FIG. 7 speaker unit;

FIG. 9 is an exploded view showing how a universal pivot mechanism of the appliance is attached to the display unit;

FIG. 12 is a top view of the FIG. 11 mechanism;

FIG. 13 is a view of the FIG. 11 mechanism;

FIG. 20 is a view showing additional ones of the system's operating components.

DETAILED DESCRIPTION OF THE INVENTION

Figure 1:
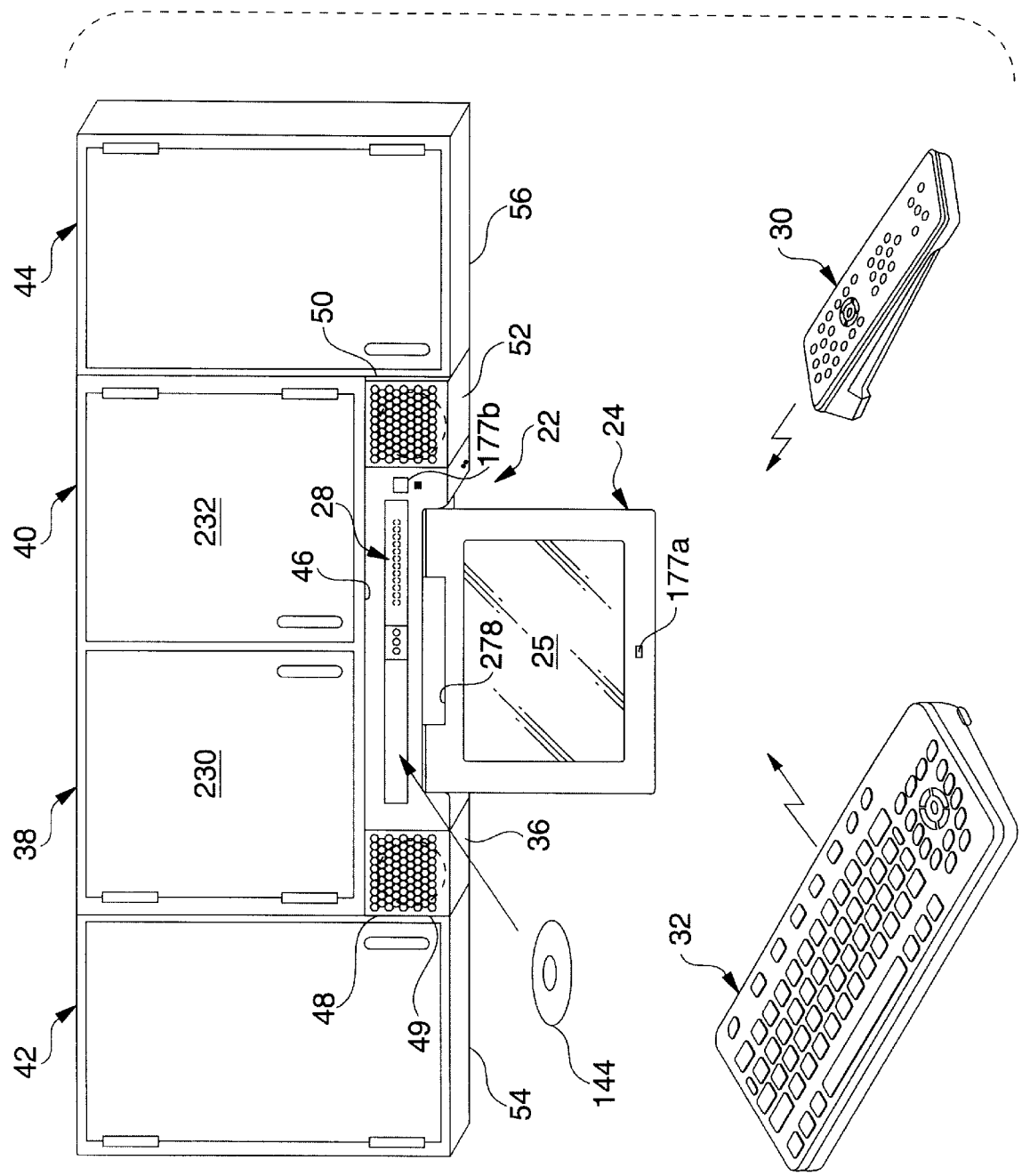
FIG. 1 is a pictorial representation of a system of overhead cabinets and, installed in those cabinets, an appliance or system embodying the principles of the present invention.

One currently representative and important application of the present invention is the provision of appliances which are designed for use in a kitchen. A multimode system or appliance suitable for this (and other) applications of the invention is illustrated in FIG. 1 and identified by reference character 20.

Appliance 20 has the following modes of operation:

TELEVISION

CD

INTERNET

APPLIANCE

SECURITY

How appliance 20 functions in each of these modes is described above in that section of the specification entitled SUMMARY OF THE INVENTION.

It is not necessary that appliance 20 have all five of the operating modes identified above. One or more of these modes may be omitted or a mode may be disenabled, typically with a provision for mode activation as described in corresponding application Ser. No. 09/478,922 filed Jan. 6, 2000.

Referring now to FIG. 1, system 20 includes an integrated unit (or module) 22 and a flat screen display unit 24 with a screen 25. The display unit is supported from module 22 by a universal type connector 26. Commands and data can be inputted to module 22 by onboard controls 28, a remote control 30, or a keyboard 32.

Remote control 30 and keyboard 32 will be described herein only to the extent that they are relevant to an understanding of the present invention. Details of these devices can be found in U.S. Pat. No. 5,724,102 and in copending application Ser. No. 09/466,103 now U.S. Pat. No. 6,215,420.

Figure 2:
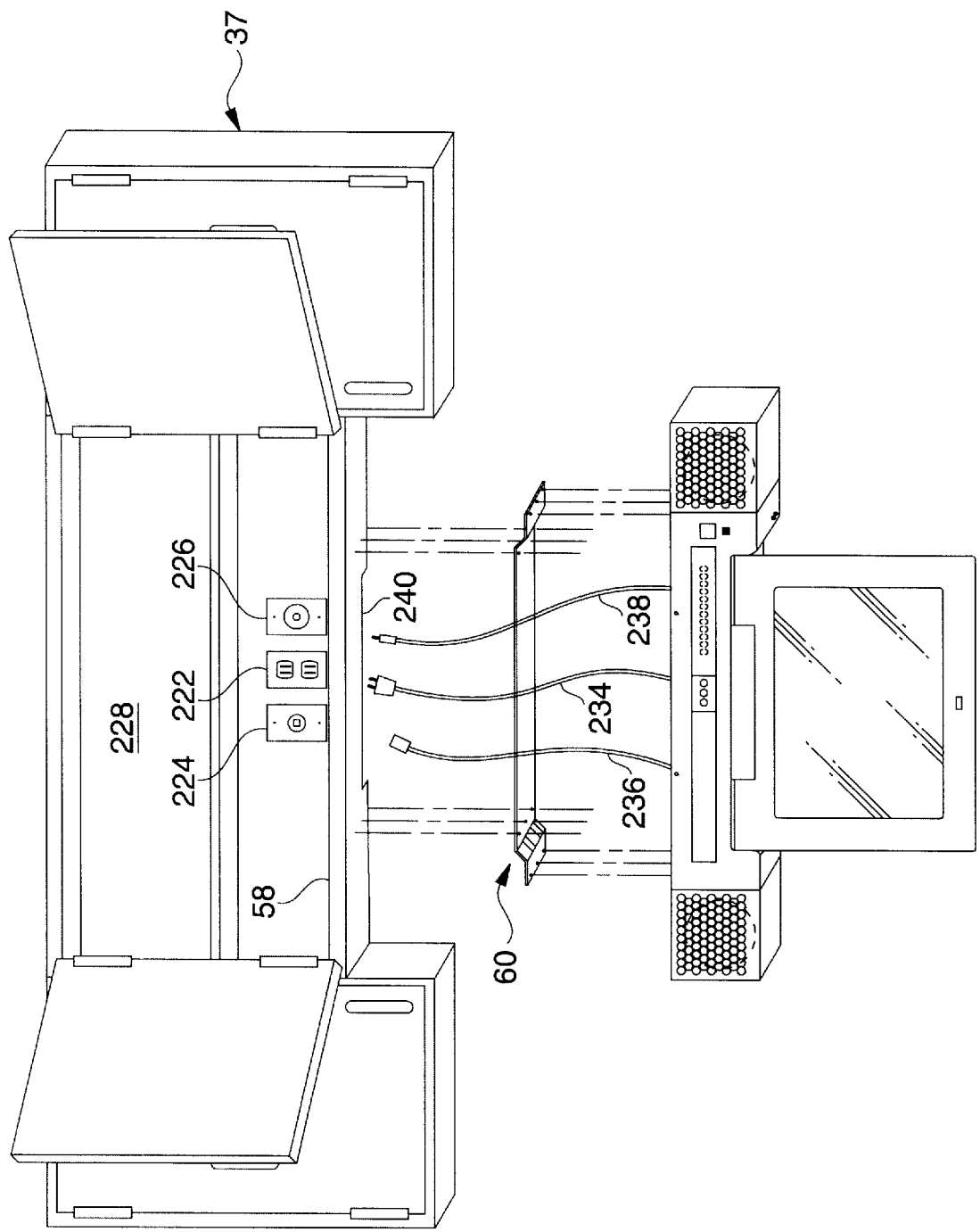
FIG. 2 is an exploded view of the overhead cabinet system, a mounting plate for attaching the appliance to that system, and an arrangement for connecting the appliance to AC power, telephone, and TV cable lines.

Referring now to FIGS. 1 and 2, the integrated unit 22 of the system 20 shown in those figures is designed to be mounted to overhead cabinet system 37; it is more specifically designed to be mounted beneath two adjacent overhead cabinets 38 and 40. Those cabinets are located between overhead cabinets 42 and 44 of greater depth.

Cabinets of the character illustrated in FIG. 1 are often supplied in conventional widths and heights. Module 22 is preferably designed and dimensioned for compatibility with such cabinets of standard dimensions.

The two shorter cabinets 38 and 40 between longer cabinets 42 and 44 provide a downwardly opening, horizontally extending recess 46. The cabinet 48 of integrated unit 22 is preferably dimensioned to fit into recess 46 with: (a) the end walls 49 and 50 of the casing abutting outermost cabinets 42 and 44, and the bottom wall 52 of the casing flush with the bottoms 54 and 56 of the two outermost cabinets.

Figure 3:
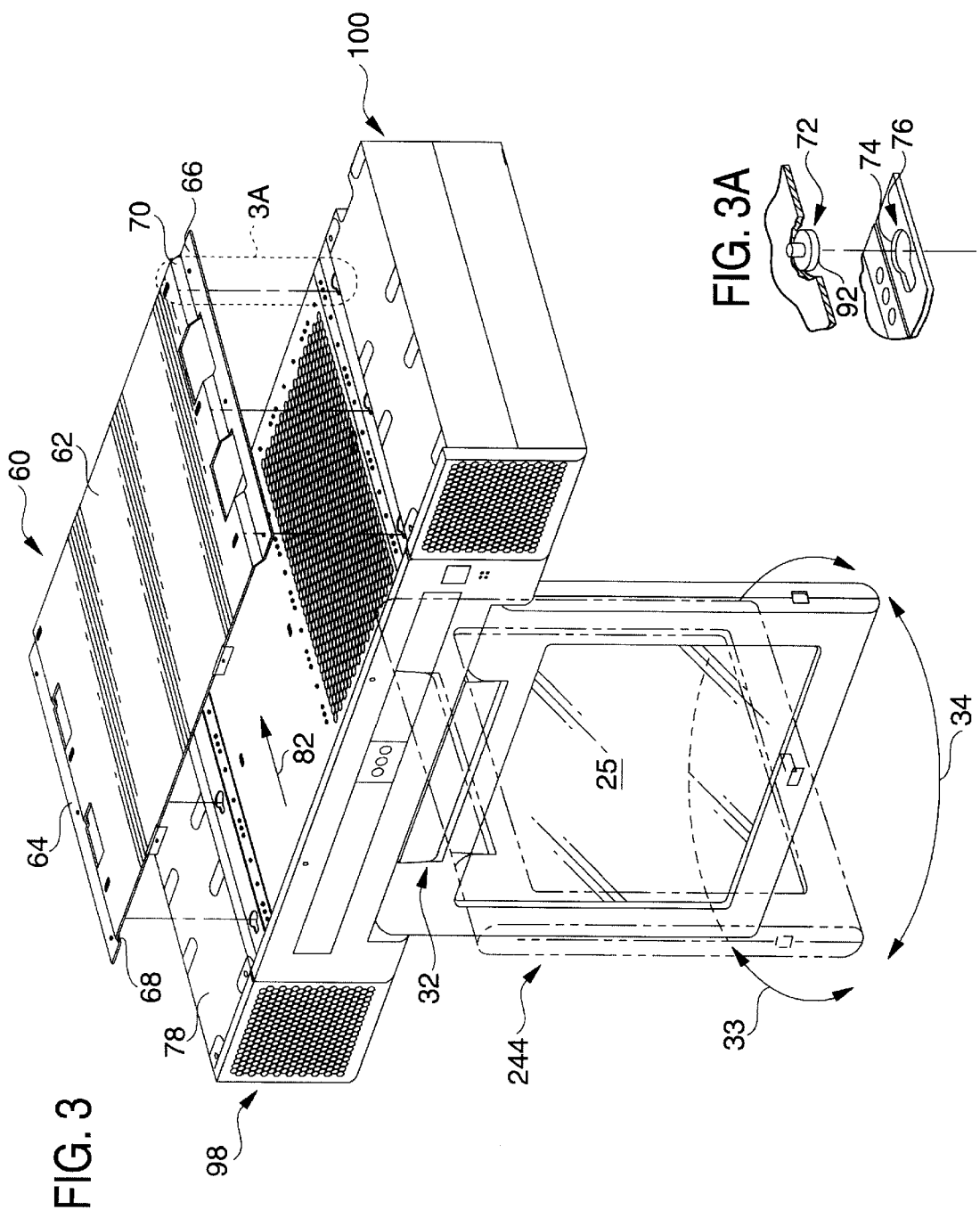
FIG. 3 is an exploded view of the appliance and mounting plate; this view also shows how a flat screen display unit is attached to the system module such that the display screen can be rotated about a vertical axis.

As is best shown in FIGS. 2 and 3, the casing 48 of integrated unit 22 is attached to a rail 58 of the cabinet system 37 shown in FIGS. 1 and 2 by a mounting plate 60. This device has a flat center segment 62 and downwardly offset end flanges 64 and 66 integrally joined to segment 62 by inclined transition elements 68 and 70.

Figure 16:
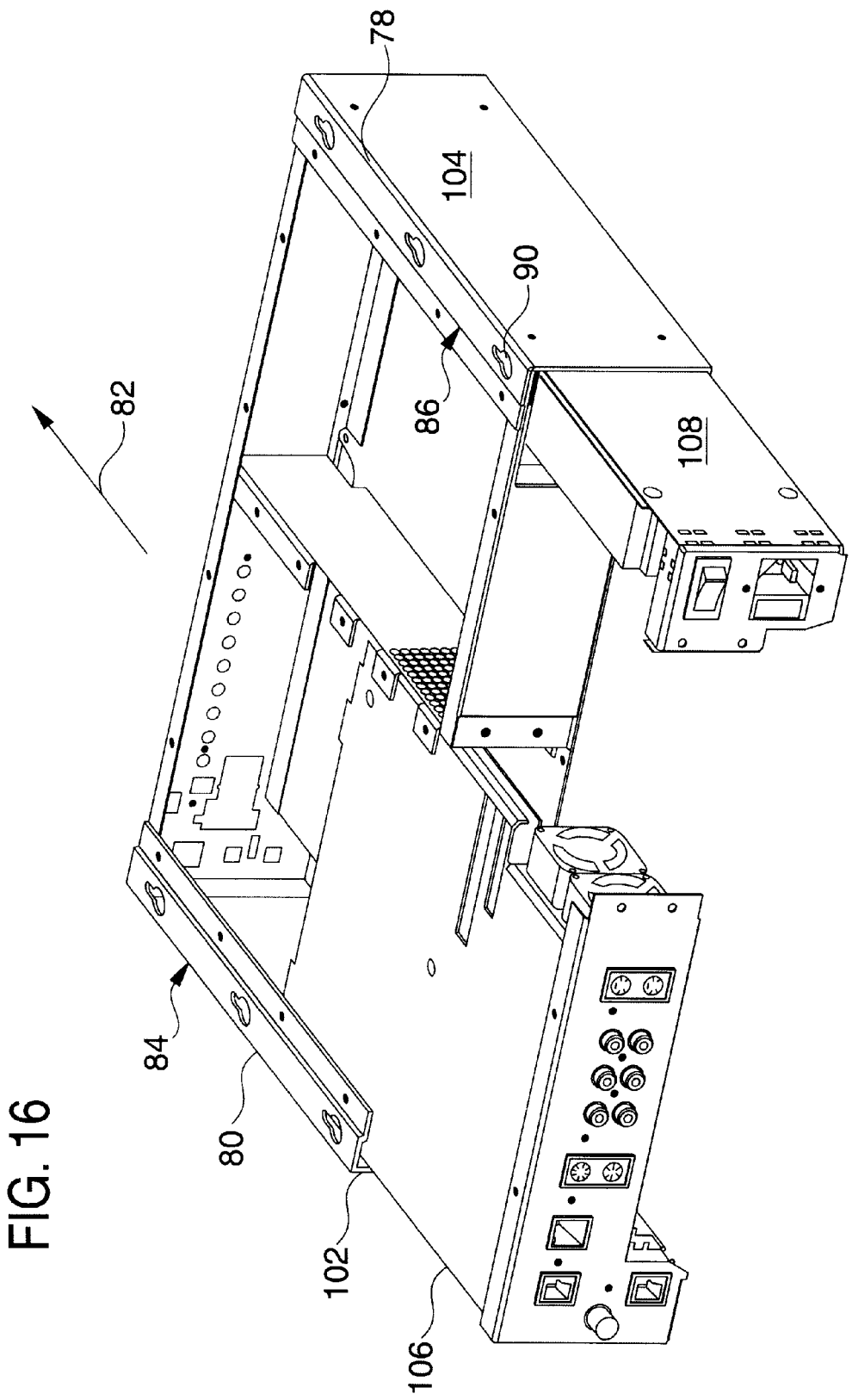
FIG. 16 is a perspective view of the chassis of the system's main module.
Figure 17:
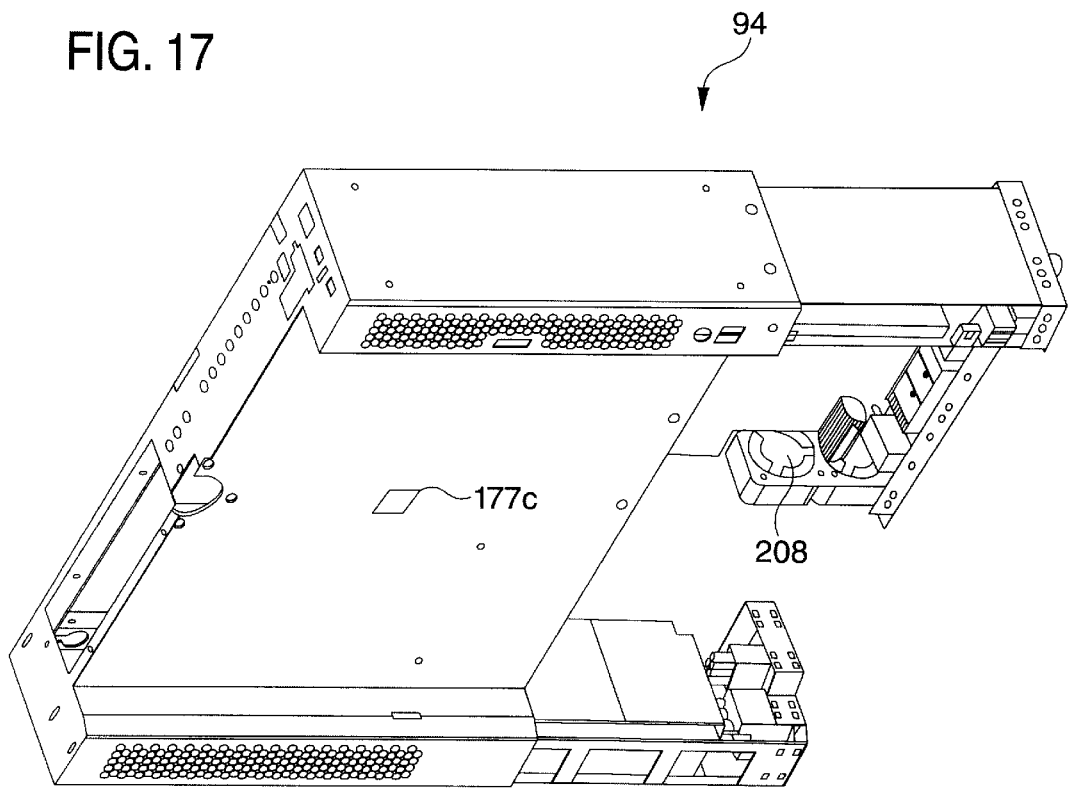
FIG. 17 is a second perspective view of the integrated unit chassis, in this instance looking up at the bottom of the chassis.
Figure 18:
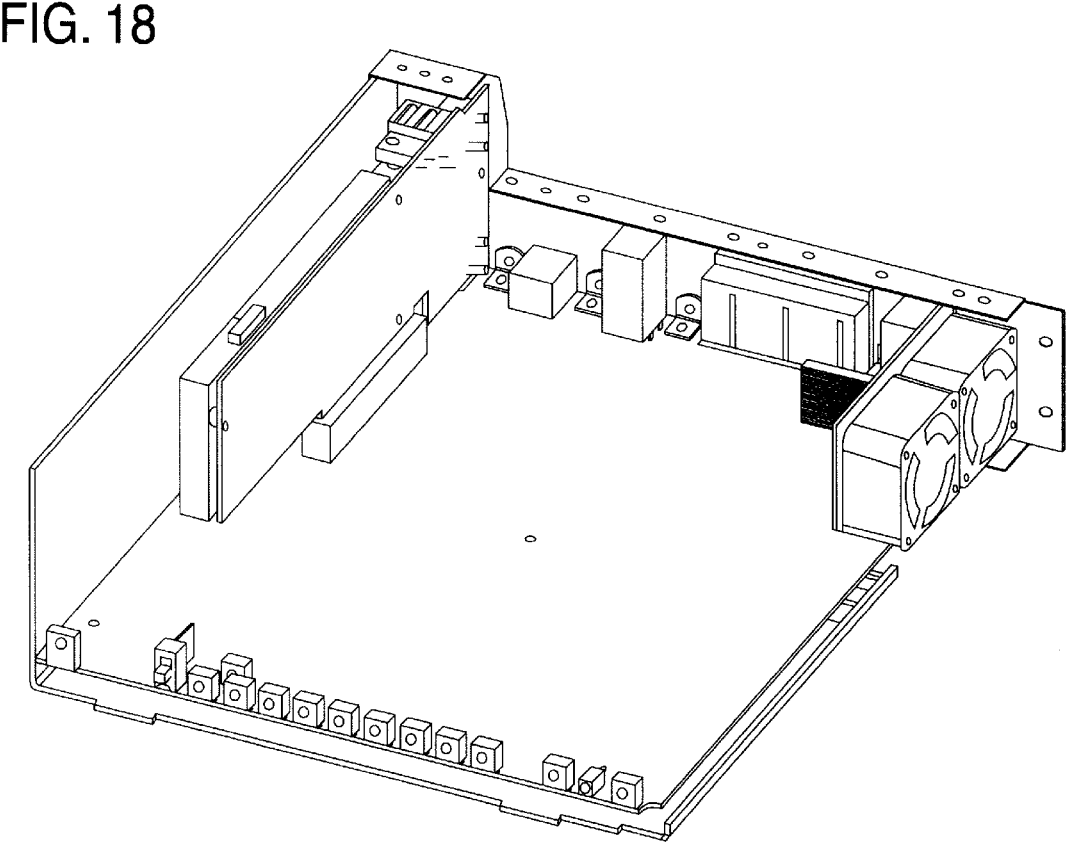
FIG. 18 shows the underside of a portion of the chassis.

Mounting plate 60 is attached by screws or otherwise fixed to structural member 58. Then, module 22 is lifted into place against mounting plate 60 and slid toward the rear of the cabinet structure 37 until headed lugs 72 extending downwardly from the end flanges 64 and 66 of mounting plate 60 are received in the larger segments 74a–f of keyhole slots 76a–f. 76a–f slots are formed in L-shaped sheet metal panels 78 and 80 located at opposite ends of integrated unit 22. As this movement (see arrow 82 in FIGS. 3 and 16) is continued, lugs 72 move into the narrower, end segments 90a–f of the keyhole slots 76a–f. This traps the heads 92a–f of the mounting lugs beneath the sheet metal top wall of cabinet 48 at the opposite ends of the cabinet, removably securing integrated unit 22 in place.

Referring now to FIGS. 3 and 16–18, integrated unit 22 has a chassis 94 to which the sheetmetal mounting panels 78 and 80 are attached. Chassis 94 also has a variety of other sheetmetal components which will be described herein only to the extent that they are relevant to an understanding of the present invention.

Audio speaker units 98 and 100 are fastened to the vertical segments 102 and 104 of the L-shaped panels 78 and 80 at the opposite ends of chassis and to vertically extending end wall components 106 and 108 of chassis 94.

The two speaker units 98 and 100 are duplicates. Consequently, only the right-hand unit 100, shown in exploded form in FIG. 8, will be described herein. This speaker unit includes a two-component enclosure (or casing) 110 in which speakers 112 and 114 are housed in a back-to-back arrangement. A grill 116 is located at the front of the speaker unit; and the two, upper and lower, sections 118 and 120 of the speaker unit casing are fastened together as by machine screws or the like (not shown) after the two casing sections have been aligned. This is done by fitting guides 122 in the upper casing section component 118 over the guides 124 in the bottom section 120. Frictionally retained tabs 126 are subsequently pressed into cooperating openings 128 in the top wall 130 of upper casing section 118 and the bottom wall 132 of lower casing section 120. These tabs conceal the screw heads.

Sound is propagated from speakers 112 and 114 primarily through the grill 116 at the front of the speaker unit and through a tuned port 134 opening onto the bottom wall 130 of lower casing section 120.

Figure 19A:
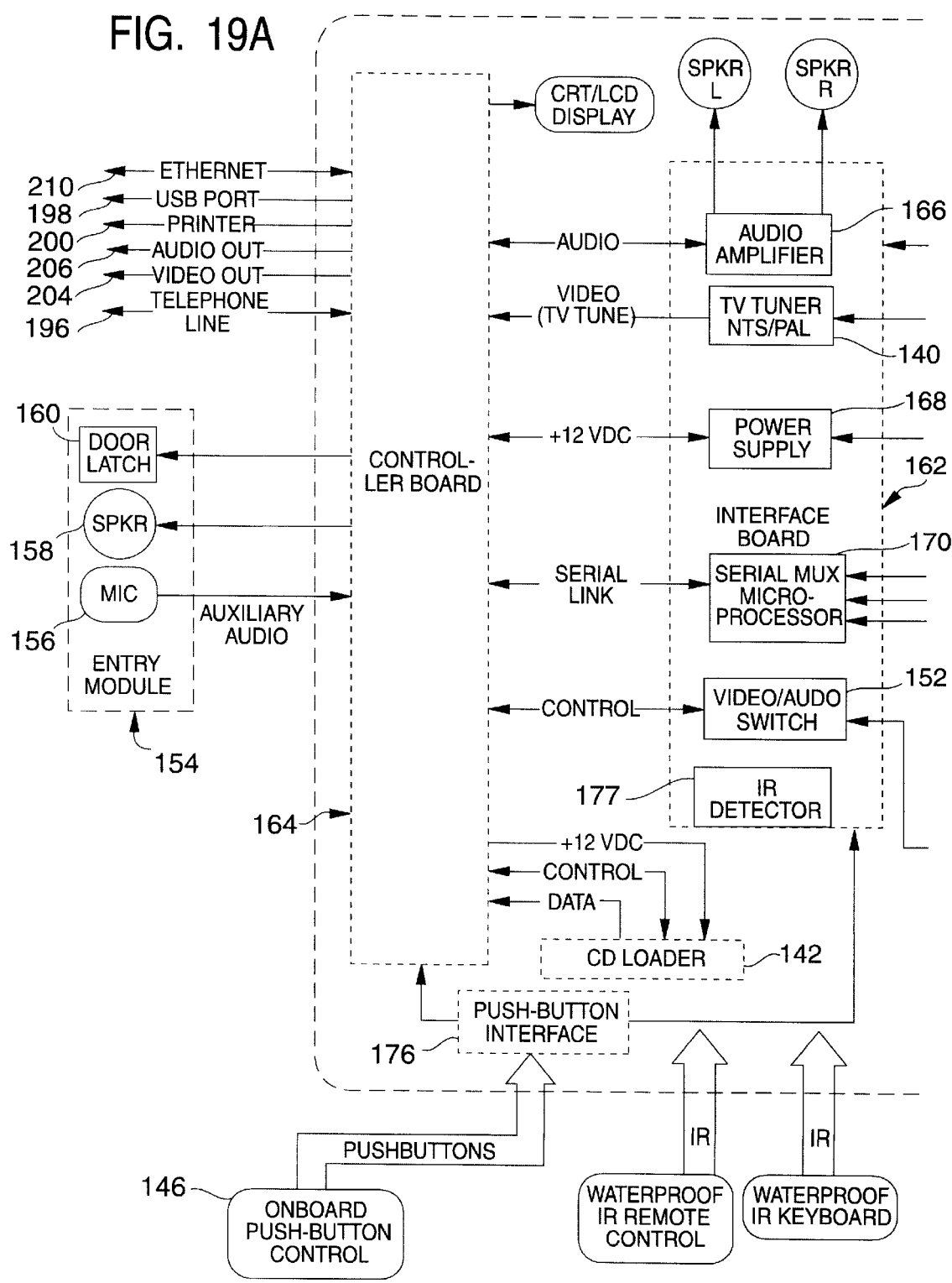
FIGS. 19A and 19B, taken together, show in block diagram form, operating components of the appliance and certain associated components of the appliance.
Figure 19B:
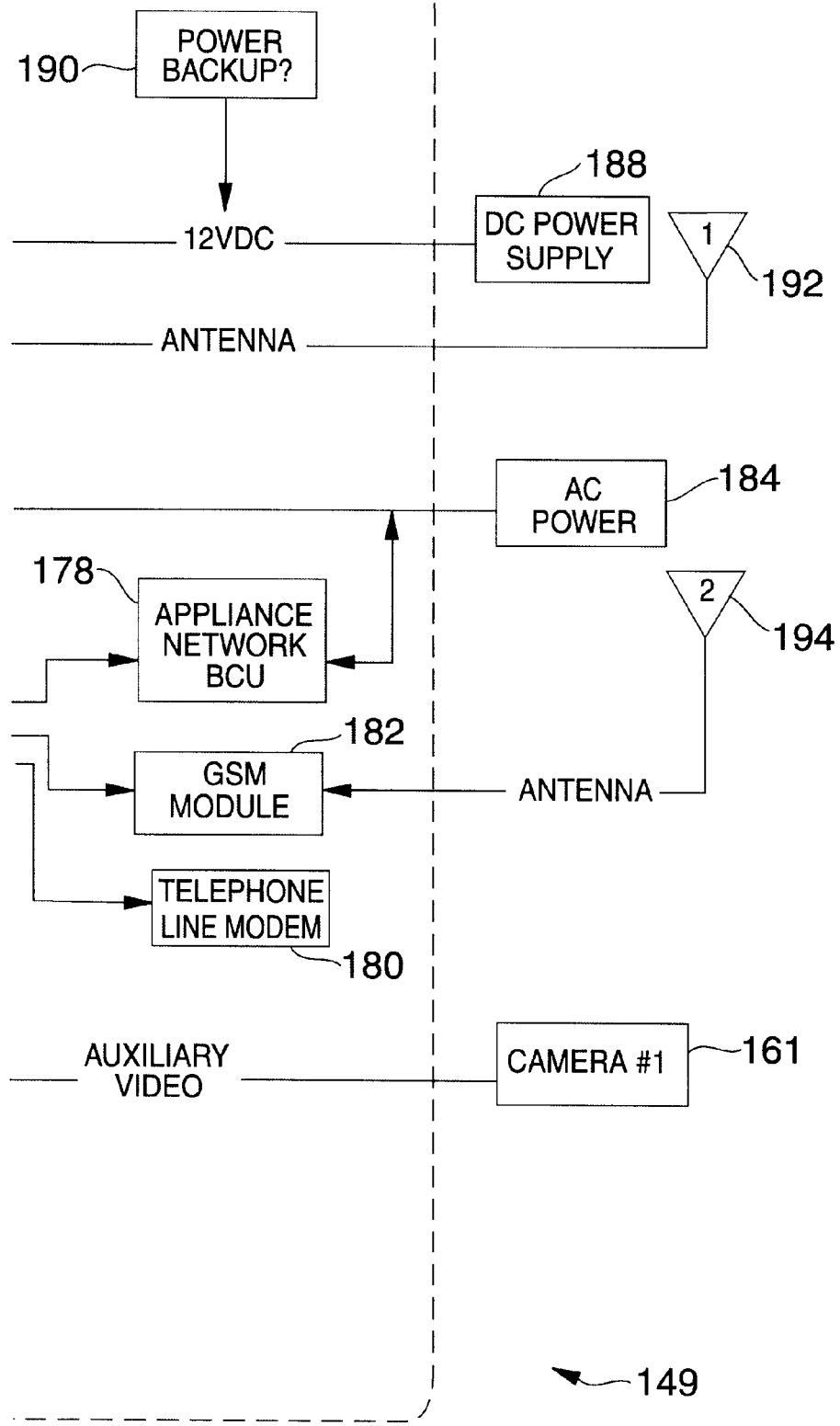

Referring now primarily to FIGS. 1, 19A, and 19B, the casing or cabinet 48 of integrated unit 22 houses a conventional TV tuner 140. The illustrated module 22 also has a player 142 for a conventional or interactive laser readable disk 144. This player is optional; it can be provided or omitted, depending upon the market for which the system is intended.

Commands for operating the TV and disk player and for selecting the mode of operation of system 20 can be inputted by the above-mentioned remote control 30 or keyboard 32 or by the FIG. 1 onboard pushbutton controls 28. One representative onboard control is identified in FIG. 19A by reference character 146.

The complement 149 of operating components of integrated unit 22 and ancillary devices which may be activated in different operating modes of system 20 are depicted schematically in FIGS. 19A, 19B, and 20.

The operating components include a mode selection register 150 and a video/audio switch 152, both activated when a particular one of the system 20 operating modes is selected. The video/audio switch channels the input available in the selected operating mode to the screen 25 of display unit 24 and to speakers 98 and 100 of that system. As a single example, when the TELEVISION mode is selected, a connection to a source for a television signal such as an antenna, cable, and/or a VCR is made through switch 152.

External components controlled by the integrated unit 22 of system 20, in this case in a SECURITY mode of operation, are incorporated in an entry module identified by reference character 154 in FIG. 19A. These components include a microphone 156, an entry way speaker 158, and an electrically operated door latch 160. Optionally located at the same entryway (not shown) as module 154 is a camera 161 which is designed to display an image of a person at the entryway on display unit screen 25 or to monitor an alternate location such as a baby's bedroom. The operation of an entryway security system of the character just described is in detail in copending application Ser. No. 09/116,825 filed Jul. 16, 1998, to which the reader may refer if desired.

Other major components of complement 149, in part located on an interface board 162, are listed below along with the function of each component.

| Reference Character | Component | Function |
| --- | --- | --- |
| 164 | Controller Board | Includes a CPU (not shown) and other components which control the operation of appliance 22 |
| 166 | Audio Amplifier | Boosts the signal available from controller board 164 to a level high enough to drive speakers 112 and 114 |
| 140 | TV Tuner | Like a conventional TV tuner |
| 168 | Power Supply | Converts AC power to (typically) 12V DC for powering components of operating component complement 149 |
| 170 | Serial MUX Microprocessor | Can route signals transmitted from controller board 1 64 to either appliance network BCU 172 or GSM module 174, eliminating the need for more than one serial port |
| 152 | Video Switch | Connects the involved components of interface board 162 to the input appropriate for each of the operating modes of appliance 20 |
| 176 | Pushbutton Interface | Operatively connects on board controls 28 to controller board 164 |
| 177a–c | Infrared Detectors | Receivers for IR signals transmitted from an input device such as remote control 30 or keyboard 32 |

In conjunction with the foregoing table, three infrared detectors 177a–c are preferably employed so that integrated unit 22 will receive a signal transmitted from an input device such as remote control 30 or keyboard 32 generally irrespective of the orientation of the input device. IR detector 177a is located on display unit 24 below screen 25 (FIG. 1). As shown in the same figure, IR receiver 177b is located on the front side of integrated unit 22. The third IR detector 177c is located on the bottom of integrated unit 22 (see FIG. 17).

Also included in, or operatively associated with interface board 162, are the following additional components:

| Reference Character | Component | Function |
| --- | --- | --- |
| 178 | Appliance Network BCU | A filter and multiplexer which allows data to be transmitted and received over lines carrying AC power by multiplexing high frequency data signals with the AC signal to transmit data and by filtering out the AC component of multiplexed signals to the data |
| 180 | Telephone Line Modem | Uses the INTERNET mode of operation in logging onto the Internet |
| 182 | GSM Module | Connects to a designated cell phone to notify one of a problem with an appliance and/or to send and receive text messages as described in copending application No. (Attorneys' Docket No. 518120-0045 filed February __, 2000) |
| 184 | AC Power Supply | Furnishes power to operating component complement 149 |
| 188 | DC Power Supply | Allows appliance 20 to be operated on DC power |
| 190 | Power Backup | Typically an onboard battery which allows appliance 20 to continue to operate if the external power source(s) fall |
| 192 | TV Antenna (may instead other TV signed input-- VCR, DVD, etc.) | Functions conventionally |
| 194 | GSM Antenna | Transmits and receives cell phone (GSM) signals |

It was pointed out above that appliance 20 can transmit and receive data via a telephone line as well as by cell phone linkups. The telephone line is shown in FIG. 19A and identified by reference character 196.

As shown in FIG. 19A, system 20 also has a USB port 198 as well as links (or connections 200, 204, and 206) for transmitting appropriately formatted data to a printer and to video and audio devices—viz., display screen 25 and speaker units 112 and 114.

Appliance 20 preferably also has an Ethernet port 210. This: (1) allows appliance 20 to be networked to compatible appliances and (2) allows the appliance to be connected to the Internet via a DSL or other broad bandwidth link.

A fan 208 mounted to the chassis of appliance module 22 keeps above-described internal components of the module from overheating.

TELEVISION, CD (if present), APPLIANCE, SECURITY/MONITOR, and INTERNET modes of operation of system 20 may be selected by the user of system 20 with push button controls 212, 214, 216, 218, and 220 of remote control 30 (see FIG. 4A) or with corresponding pushbuttons of keyboard 32 or corresponding ones of the onboard controls 28.

Referring now to FIG. 20, electronic video/audio switch 152 is illustrated as a mechanical switch in the interest of clarity. This switch has five positions labeled 1–5.

The pressing of one of the five mode buttons 212, 214, 216, 218 and 220 causes the corresponding number—shown in the following table—to be placed in mode selection register 150.

| Mode | Number |
|---|---|
| CD | 1 |
| TELEVISION | 2 |
| SECURITY/MONITOR | 3 |
| INTERNET | 4 |
| APPLIANCE | 5 |

Video switch 152 is almost instantaneously set to the number in selection register 150, causing integrated unit 24 to operate in the selected mode.

Additional details on operating components of integrated unit 22 are to be found in the following U.S. patents and copending applications hereby incorporated by reference herein.

| | U.S. patent | |
|---|---|---|
| U.S. Pat. No. | Title | Issue Date |
| 5,724,102 | Systems in which Information can be Retrieved from an Encoded, Laser Readable Disc | 3-03-1998 |

| | COPENDING U.S. applications | |
|---|---|---|
| U.S. application No. | Title | Filing Date |
| 09/466,103 | Keyboard I | 12-17-1999 |
| 09/116,825 | Integrated Units with Home Security and Monitoring Capabilities | 7-16-1998 |
| Attorneys' Docket No. 518120-0037 | | |
| Attorneys' Docket No. 518120-0045 | Cell phone-equipped appliance | In Progress |
| 09/479,274 | Appliance with multiple modes of operation | 1-05-2000 |
| 09/116,785 | Integrated Units with Diagnostic Capabilities | 7-16-1998 |
| 09/478,922 | Appliances | 1-06-2000 |

The functions of the other buttons on remote control 30 and the keys on keyboard 32 are described in the '102 patent and in the copending '103 application.

Referring now to FIGS. 1 and 2, electrical power, telephone, and TV cable outlets 222, 224, and 226 for system 20 may, for aesthetic purposes, be mounted on the vertical wall 228 from which the overhead cabinet system 37, shown in FIGS. 1 and 2, is mounted behind cabinet doors 230 and 232, which can be opened to access the outlets. External lines 234, 236, and 238 trained through an opening 240 in the bottom rail 58 of the cabinet system connect the operating components of integrated unit 22 to the just-identified outlets.

Turning next to FIGS. 3–6 and 9–16, it was pointed out above that a universal-type pivot mechanism, identified by reference character 26, is used to connect the display unit 24 of system 20 to integrated unit 22. This allows the display unit to be tilted and rotated to face a viewer and to be folded up against the bottom of module 22 when system 20 is not in use or is being employed in an operating mode which does not involve the display unit. Furthermore, pivot mechanism 26 allows display unit 24 to be folded up against the module with the display screen 25 of the display unit exposed (FIG. 5) or with the display unit first rotated and then folded upwardly (FIG. 6) so that the back panel 244 of the display unit housing 246 covers the screen 25 of the display unit, protecting the screen from damage. As pointed out above, that universal pivot mechanism 26 includes a clutch which retains the display unit screen 25 in the orientation to which it is adjusted by a user or other viewer. This is important because a flat screen like screen 25 must be viewed head-on or nearly head-on for the displayed image to be satisfactorily seen.

Figure 11:
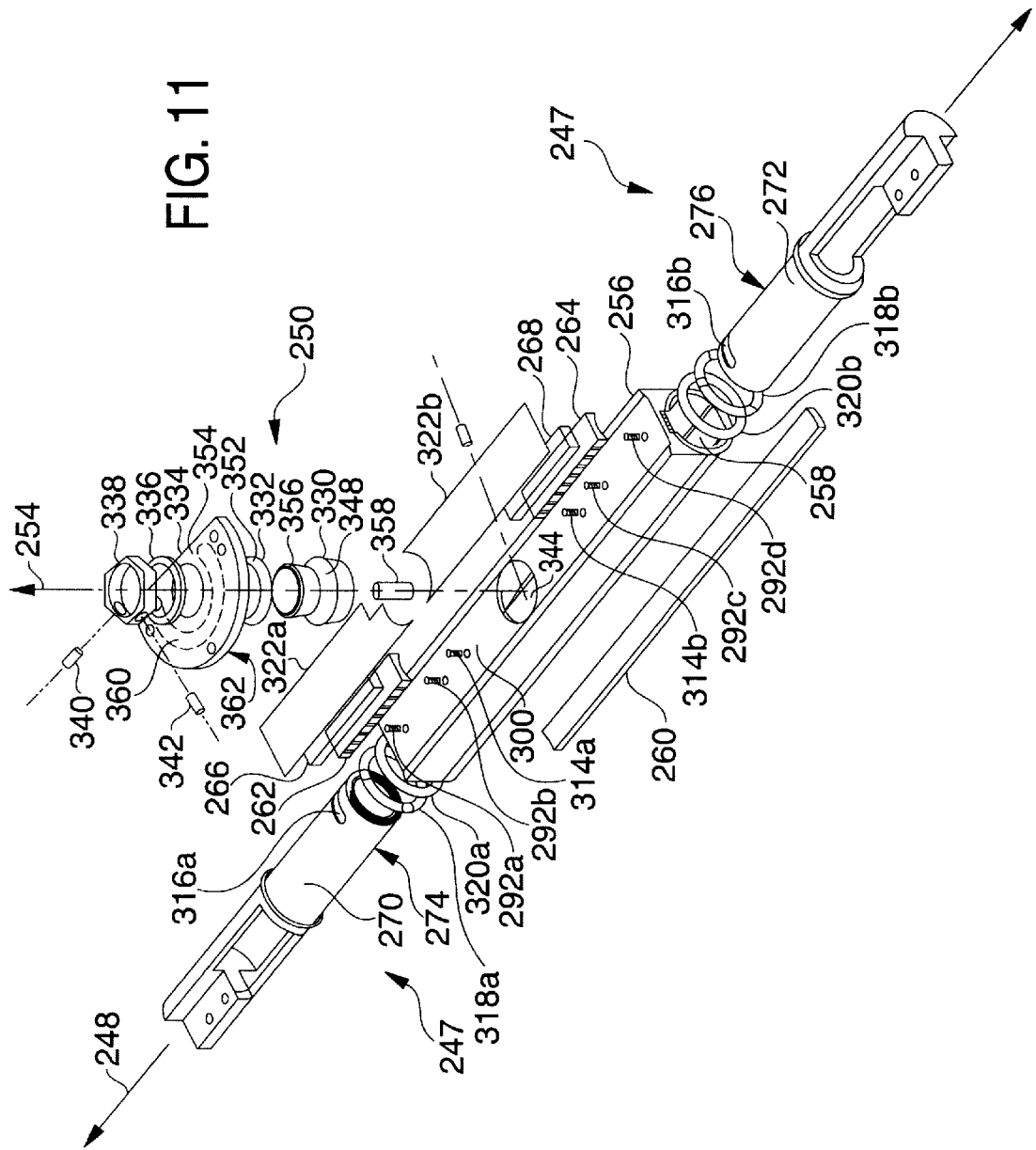
FIG. 11 is an exploded view of the universal pivot mechanism.
Figure 14:
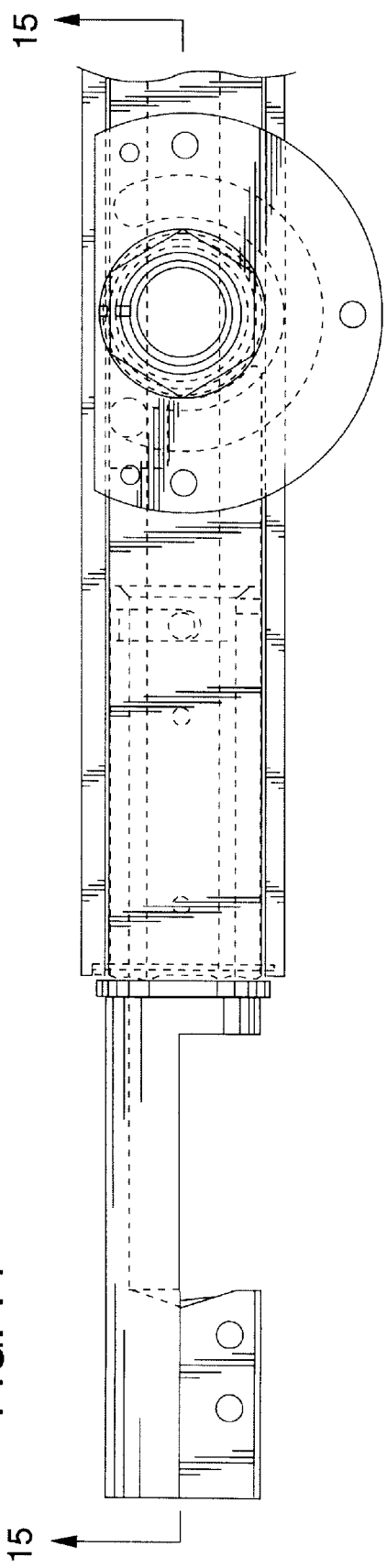
FIG. 14 is a fragment of FIG. 12 drawn to an enlarged scale to better show details of the universal pivot mechanism.

As is best shown in FIGS. 9–15, universal pivot mechanism 26 has one set (or complement 247) of components that allow display unit 24 to be rotated about a horizontal axis (identified by reference character 248 in FIGS. 5 and 6) and a second complement 250 of components which allow display unit 24 to be rotated about the vertical axis (identified in FIG. 11 by reference character 254). The vertical pivot components 247 of mechanism 26—i.e., those components which allow display unit 24 to be pivoted down to an operating position and up to a stowed position—include an elongated support block 256. A bore or internal recess 258 extends from end-to-end of the support block. Housed in this recess are a lower clutch pad 260 and two upper clutch pads 262 and 264. The upper clutch pads are located towards the ends of support block 256 on opposite sides of the horizontal pivot structure 250.

Also housed in the bore 258 of the universal pivot mechanism 26 are two clutch pad backing plates 266 and 268. These backing plates overlie upper clutch pads 262 and 264.

Cooperating clutch pad pairs 260/262 and 260/264 frictionally engage clutch elements 270 and 272 of pivot followers 274 and 276. The clutch elements of pivot followers 274 and 276 are housed in the bore 258 through support block 256.

Referring now primarily to FIG. 9, the assembly of support block 256 and pivot followers 274 and 276 is seated in a complementary display unit notch or recess 278. This recess is formed in the upper, horizontal segment 280 of display unit casing (or housing) 282. The support block is shaped to match the contour of the upper display casing segment 280. Pins 284 are provided at the opposite ends of recess 278. These pins extend through complementary apertures 286 in flanges 287 and 288 at the ends of the two pivot followers 274 and 276, positioning universal pivot mechanism 26 in display unit casing component 289. Assembly is completed (see FIG. 10) by fastening a front cover component 290 of the display unit casing 282 in place. As casing component 290 is moved into place, positioning pins 284 extend into recesses 291 in casing element 290 to position that component relative to the complementary casing component 289.

As a consequence of the arrangement just described, pivot mechanism support block 256 rotates with display unit 24 as the display unit is rotated down to a viewable orientation and upwardly to a stowed position.

The pivotal movement of support block 256 is resisted by the friction between pivot follower clutch elements 270 and 272 and the two pairs of complementary clutch pads 260/262 and 260/264. This friction or drag is relied upon to retain display unit 26 in the orientation to which it is tilted.

The drag (or resistance to rotation) of support block 256 and display unit 26 is adjusted by set screws 292a–d threaded through the top 300 of support block 256 into engagement with the clutch pad backing plates 266 and 268.

Figure 5:
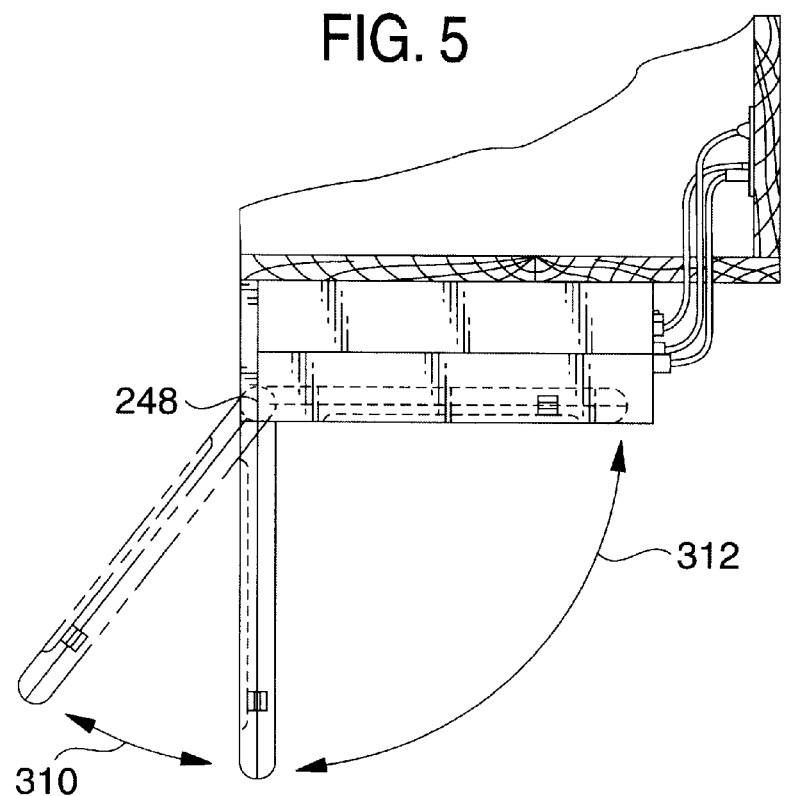
FIG. 5 shows how the display unit can be pivoted about a horizontal axis to a stowed, out-of-the-way position in which it rests against the bottom of the system module.
Figure 6:
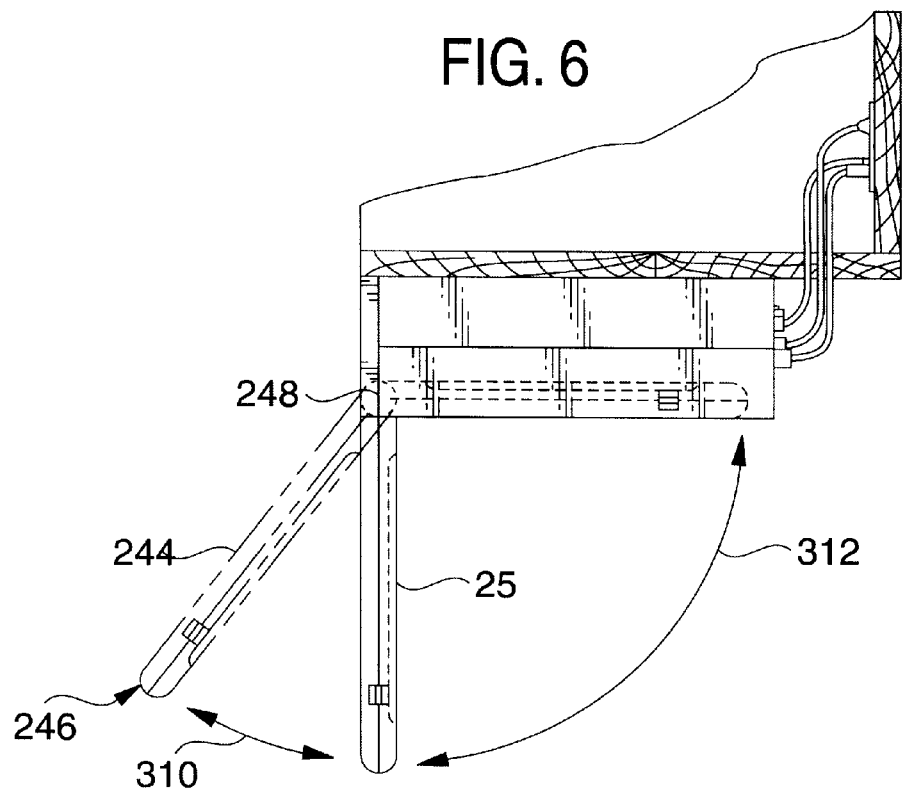
FIG. 6 is like FIG. 5 but shows that the display unit can be rotated about a vertical axis before it is pivoted to the stowed position; this results in the casing of the display unit being exposed and protecting the display unit screen from damage.
Figure 7:
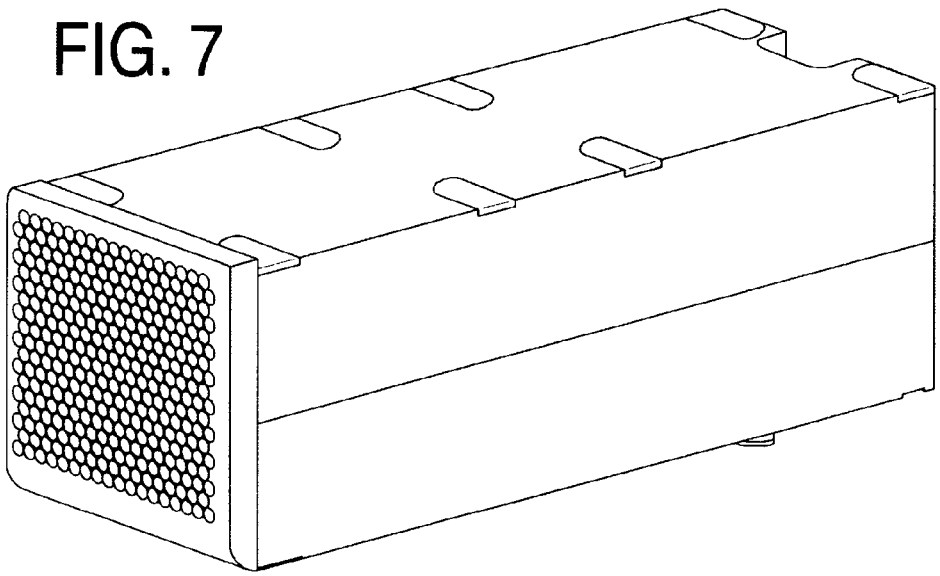
FIG. 7 is a perspective view of a speaker unit which is part of the FIG. 3 appliance.
Figure 10:
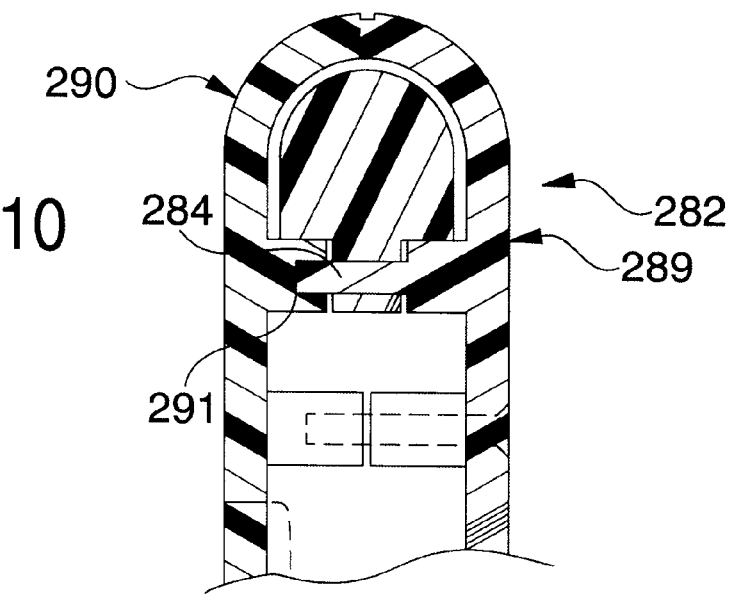
FIG. 10 is a section through FIG. 9, taken essentially along lines 10—10 of the latter figure.

Referring still to FIG. 11, the limits of travel (or rotation) of display unit 26—respectively identified by reference characters 310 and 312 in FIGS. 5 and 6—are determined by set screws 314a and 314b (see FIG. 11). These set screws are threaded through the upper segment 300 of support block 256 into circumferentially extending grooves 316a and 316b. These grooves are formed in the hollow, cylindrical clutch elements 270 and 272 of pivot followers 274 and 276. When display unit 26 is rotated to the extent that as set screws 314a or 314b reaches an end of the groove into which it extends, further rotation of display unit 26 about its horizontal axis 248 is precluded. A 210° arc provides the limits on pivotal movement of the display unit identified by reference characters 310 and 312 in FIGS. 5 and 6.

In addition to limiting the travel of display unit 26, the set screw/groove complements 314a/316a and 314b/316b keep the pivot followers 274 and 276 from shifting longitudinally in support block 256.

Additional components of the universal pivot component complement 247 are wavy washers 318a and 318b. These washers cooperate with washer plates 320a and 320b to center support block 256 between pivot followers 274 and 276 when the universal pivot 26 is attached to display unit casing component 289.

Reference characters 322a and 322b in FIG. 11 identify adhesively-backed labels. These labels are applied to the upper surface 300 of support block 256 for cosmetic purposes; viz., to cover the above-discussed clutch pressure adjustments screws 292a–d and the end follower retention end rotation limiting set screws 314a and 314b.

Referring still to FIG. 11, that component complement 250 of universal pivot 26 which allows display unit 26 to be rotated about vertical axis 254 (see FIG. 3) includes a pivot center 330, a vertical pivot bearing 332, a vertical pivot bearing race/support 334, a vertical pivot bearing plate 336, a vertical pivot retaining ring 338, and two set screws 340 and 342.

Pivot center 330 is threaded into a drilled and tapped aperture 344 in the top wall segment 300 of support block 256. The pivot center is then retained in place by set screw 340.

Figure 15:
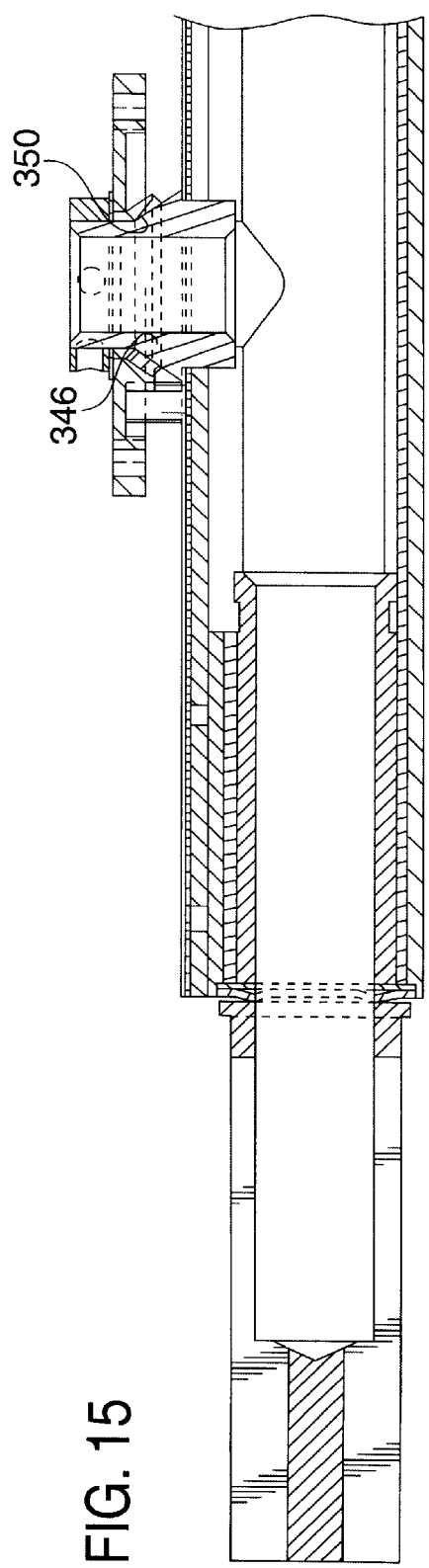
FIG. 15 is a section to the universal pivot mechanism, taken essentially along lines 15—15 of FIG. 14.

Pivot bearing 332 has a conical inner surface 346 (see FIG. 15). This surface matches an external conical surface 348 on pivot center 330 with the pivot bearing 332 seated on pivot center 330 as shown in FIG. 15.

Vertical pivot bearing race/support 334 is seated on pivot bearing 332 with a conical internal bearing surface 350 (see FIG. 15) of the race/support contacting a complementary external conical surface 352 on the pivot bearing.

Figure 4:
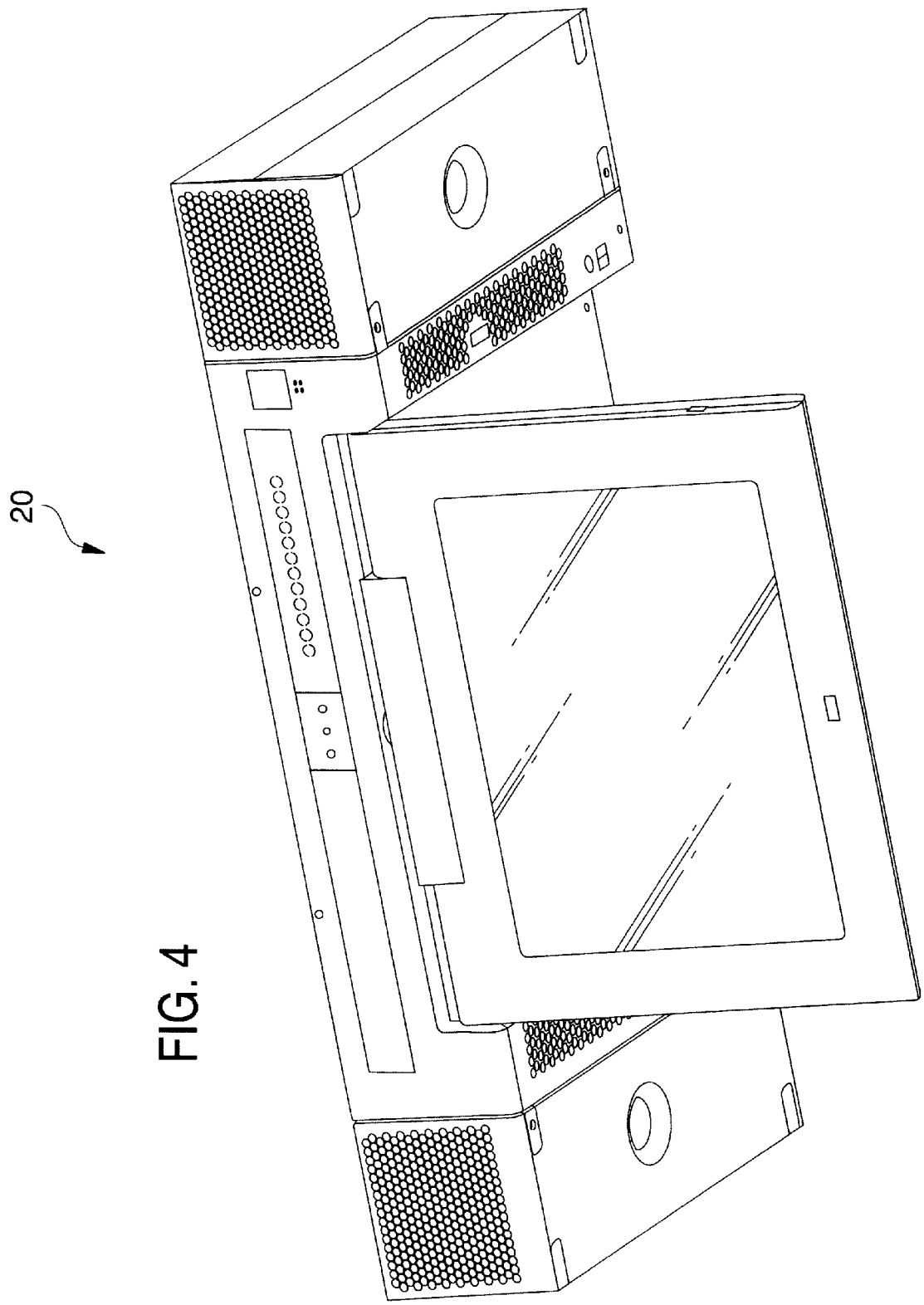
FIG. 4 is a perspective view of the system module and display unit with the latter pivoted downwardly so that the screen of the unit faces a viewer.
Figure 4A:
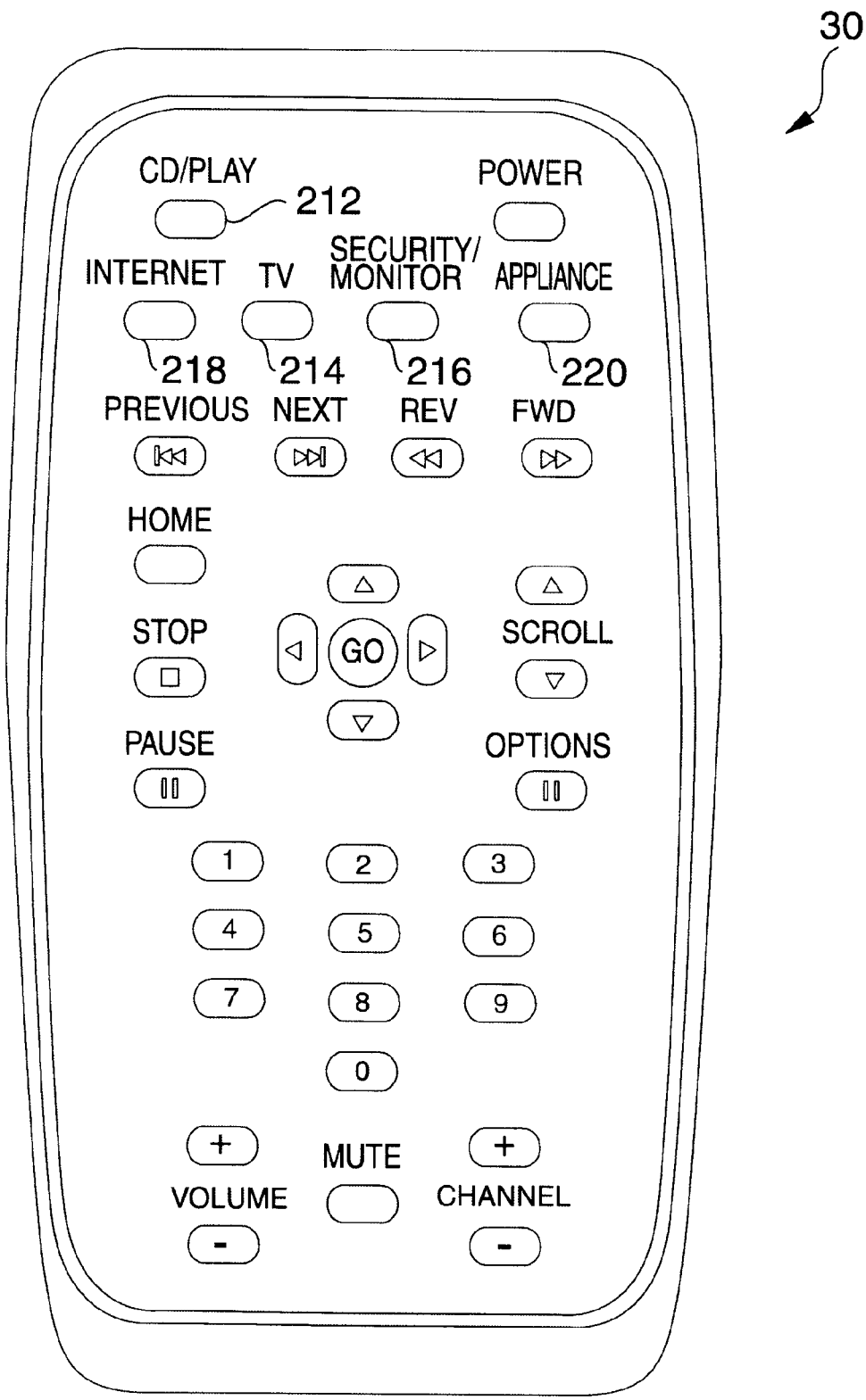
FIG. 4A is a plan view of a remote control.

The vertical pivot bearing plate 336 is bolted or otherwise attached to the bottom of the system's integrated cabinet (see FIGS. 4 and 5). This fixes the bearing plate against rotation. The display unit 24 can nevertheless be rotated about vertical axis 254 because pivot bearing 332 can rotate in bearing race/support 334 about vertical axis 254. Retaining ring 338 can be tightened and loosened as needed to provide that friction between the thrust bearing surface 352 of pivot bearing 332 and the complementary informal surface 350 of the bearing race/support to a level which is low enough that the display unit 24 can be rotated to a selected orientation about axis 254 but high enough that the display unit will remain in the position to which it is adjusted.

Referring primarily to FIG. 11, vertical pivot bearing plate 336 is seated on the upper surface 354 of bearing race/support 334 and is aligned respective to that component by an upwardly extending threaded portion 356 of pivot center 330. With the components of complement 250 thus far described in place, retaining ring 338 is threaded onto this externally threaded segment 356 of pivot center 330. Assembly of the universal pivot complement 250 is completed by tightening set screws 340 and 342. These set screws are threaded through retaining ring 338 and engage the threaded upper segment 356 of pivot center 330. They keep the retaining ring 338 from unscrewing as display unit 26 is rotated about vertical axis 254.

As is also shown in FIG. 11, a rotation limiting post 358 is pressed into the upper element 300 of support block 256. The post extends into a circumferentially extending groove 360 that opens onto the lower side 362 of bearing race/support 334. This pin-and-groove arrangement limits the rotation of display unit 26. As a consequence, display unit 26 cannot be rotated to the extent that it would entangle, or break, electrical leads extending between display unit 26 and the main module 22 of system 20.

The invention may be embodied in many forms without departing from the spirit or essential characteristics of the invention. The present embodiment is therefore to be considered in all respects as illustrative and not restrictive. The scope of the invention is indicated by the appended claims rather than by the foregoing description. All changes which come within the meaning and range of equivalency of the claims are intended to be embraced therein.

What is claimed is:

1. An appliance comprising:

a module having a plurality of components for generating a video signal, and a casing having a top wall and a bottom wall, the casing housing said components;

a display unit having a screen for displaying an image derived from said video signal; and a mechanism operably connected to suspend the display unit from the bottom wall of said casing such that said display unit can be rotated about a vertical axis relative to said casing and about a horizontal axis relative to said casing, the display unit suspending mechanism including:

a support block having a bore and a plurality of pivot followers attached to said display unit, each pivot follower having a clutch segment; and a clutch operably configured to retain the display unit in an orientation to which the display unit is rotated;

said clutch comprising the clutch segments of said pivot followers;

said clutch segments being housed in the bore of said support block; and said clutch further comprising a plurality of clutch elements disposed in said support block and adapted to frictionally engage the clutch segments of the pivot followers.

2. The appliance in claim 1, further comprising a member for mounting the appliance to a supporting structure, said mounting member and the top wall of the casing having complementary features for detachably fixing the appliance to the mounting member.

3. The appliance in claim 1, wherein the display unit suspending mechanism is adapted to selectively rotate the display unit within a range of 0–360 degrees about the vertical axis of the casing and to selectively tilt the display unit substantially about the horizontal axis of the casing such that the screen of the display unit faces a viewer.

4. The appliance in claim 1, wherein the display unit suspending mechanism is adapted to rotate the display unit to a stowed position such that the display unit lies against the bottom wall of the casing.

5. The appliance in claim 1 wherein:

said display unit has a panel located on one side of said display unit opposite of said screen; and the display unit suspending mechanism is adapted to selectively rotate the display unit within a range of 0–360 degrees about the vertical axis of the casing from a deployed orientation and then to selectively fold the display unit against the bottom wall of the casing so that the display unit screen faces the bottom wall of the casing such that said panel of the display unit substantially overlays and protects the screen.

6. The appliance in claim 5, wherein the casing has a recess adapted to receive the display unit when said screen is folded against said casing bottom wall, the panel of said display unit being substantially flush with the recess of the casing.

7. The appliance of claim 1 in which said clutch comprises at least one friction control element adapted to selectively adjust the pressure between the clutch elements and the clutch segments of the pivot followers.

8. The appliance as defined in claim 1 in which the display unit suspending mechanism comprises:
   a first component fixed to said casing;
   a second component fixed to the display unit; and
   a bearing assembly between said first and second components which allows the display unit to be rotated about the vertical axis relative to said casing.

9. The appliance as defined in claim 8 in which the display unit suspending mechanism comprises an arrangement for adjusting the friction between components of the bearing assembly such that the display unit can be freely rotated about said vertical axis but will remain in the orientation to which it is adjusted.

10. The appliance in claim 1, further comprising a keyboard having means for wireless communication to said module.

11. The appliance in claim 1, wherein said module has a plurality of operating modes; and the appliance further comprises an input device having a plurality of controls, each control operably configure to select one of said operating modes.

12. The appliance in claim 11, wherein
   said input device has means for wirelessly communicating the selected one of said operating modes to said module, and
   said module further comprises a signal detector operably configured to receive the selected one of said operating modes.

13. An appliance comprising:
   a module having a plurality of components for generating a video signal, and a casing having a top wall and a bottom wall, the casing housing said components;
   a display unit having a screen for displaying an image derived from said video signal; and
   a mechanism operably connected to suspend the display unit from the bottom wall of said casing such that said display unit can be rotated about a vertical axis relative to said casing and about a horizontal axis relative to said casing,
   the display unit suspending mechanism comprising:
      a plurality of elements for limiting the degree of tilt of the vertical axis,
      a support block restrained against rotation about a horizontal axis of the display unit; and
      a plurality of pivot followers which are fixed to the display unit and are rotatable in the support block; each pivot follower having a slot
      each of the elements for limiting the rotation of the display unit about said horizontal axis extending from said support block into circumferentially extending slots in the pivot followers.

14. An appliance comprising:
   a module having a plurality of components for generating a video signal, and a casing having a top wall and a bottom wall, the casing housing said components;
   a display unit having a screen for displaying an image derived from said video signal; and
   a mechanism operably connected to suspend the display unit from the bottom wall of said casing such that said display unit can be rotated about a vertical axis relative to said casing and about a horizontal axis relative to said casing,
   the display unit suspending mechanism comprising:
      a display unit support block;
      a plurality of pivot followers, a first and a second of the pivot followers disposed in opposite ends of the support block; and
      a plurality of elements adapted to exert pressure in the direction of said horizontal axis to center the support block between the first and second pivot followers.

15. An appliance comprising:
   a module having a plurality of components for generating a video signal, and a casing having a top wall and a bottom wall, the casing housing said components;
   a display unit having a screen for displaying an image derived from said video signal; and
   a mechanism operably connected to suspend the display unit from the bottom wall of said casing such that said display unit can be rotated about a vertical axis relative to said casing and about a horizontal axis relative to said casing,
   a plurality of audio speaker units mounted to said casing, a first and a second of the plurality of audio speaker units disposed at opposite ends of said casing, each of said audio speaker units includes a speaker enclosure and at least one speaker disposed in the speaker enclosure, the speaker enclosure of each audio speaker units having a grill forming one end of the speaker enclosure and a tuned port defining an opening through a wall of the speaker enclosure.

16. The appliance in claim 15, wherein each of said audio speaker units has two speakers disposed in said speaker enclosure to face opposite ends of said speaker enclosure.

17. The appliance in claim 15, wherein the appliance is adapted to be removably mounted beneath a cabinet such that the tuner port opening faces downward.

18. The appliance in claim 15, wherein the appliance is adapted to be removebly mounted beneath a first cabinet and next to a second cabinet having a bottom wall, and the display unit is adapted to be folded up against said bottom wall of said module casing such that the display unit and the bottom wall of the second cabinet lie in the same plane.

\* \* \* \* \*